(12) United States Patent
Tugcu et al.

(10) Patent No.: US 8,867,504 B2
(45) Date of Patent: Oct. 21, 2014

(54) PROVIDING DISTRIBUTED WIDE AREA COVERAGE INFRASTRUCTURE USING BLUETOOTH SIGNAL COMBINER

(75) Inventors: Mehmet Tugcu, Plantation, FL (US); Jeffrey R. Cook, Coral Springs, FL (US); John Reckert, Kendall, FL (US)

(73) Assignee: Burger King Corporation, Miami, FL (US)

( * ) Notice: Subject to any disclaimer, the term of this patent is extended or adjusted under 35 U.S.C. 154(b) by 271 days.

(21) Appl. No.: 11/433,708

(22) Filed: May 12, 2006

(65) Prior Publication Data
US 2006/0274705 A1 Dec. 7, 2006

Related U.S. Application Data

(60) Provisional application No. 60/681,088, filed on May 13, 2005.

(51) Int. Cl.
| | |
|---|---|
| H04W 4/00 | (2009.01) |
| H04B 7/00 | (2006.01) |
| H04M 1/00 | (2006.01) |
| H04B 1/38 | (2006.01) |
| H04W 92/16 | (2009.01) |
| H04W 88/08 | (2009.01) |
| H04W 84/16 | (2009.01) |
| H04W 92/20 | (2009.01) |
| H04W 84/10 | (2009.01) |
| H04W 88/18 | (2009.01) |
| H04W 84/12 | (2009.01) |
| H04W 92/02 | (2009.01) |

(52) U.S. Cl.
CPC .............. *H04W 92/16* (2013.01); *H04W 84/16* (2013.01); *H04W 92/20* (2013.01); *H04W 88/085* (2013.01); *H04W 84/10* (2013.01); *H04W 88/18* (2013.01); *H04W 84/12* (2013.01); *H04W 92/02* (2013.01)
USPC ........ 370/338; 455/41.2; 455/554.2; 455/561

(58) Field of Classification Search
USPC .............. 455/41.2, 561, 554.2; 370/338, 328, 370/336, 337
See application file for complete search history.

(56) References Cited

U.S. PATENT DOCUMENTS

| | | | | |
|---|---|---|---|---|
| 6,405,027 | B1 * | 6/2002 | Bell ............................... | 455/403 |
| 6,675,015 | B1 * | 1/2004 | Martini et al. ................ | 455/436 |
| 2003/0002473 | A1 * | 1/2003 | Goodings et al. ............. | 370/349 |
| 2003/0053524 | A1 * | 3/2003 | Dent .............................. | 375/148 |
| 2004/0001468 | A1 * | 1/2004 | Bichot et al. .................. | 370/338 |
| 2004/0100930 | A1 * | 5/2004 | Shapira et al. ................ | 370/338 |
| 2004/0214597 | A1 * | 10/2004 | Suryanarayana et al. . | 455/552.1 |
| 2005/0197061 | A1 * | 9/2005 | Hundal ........................ | 455/41.2 |

* cited by examiner

*Primary Examiner* — Christopher M Brandt
(74) *Attorney, Agent, or Firm* — Arent Fox LLP

(57) ABSTRACT

A distributed wide area coverage system is disclosed that effectively expands the coverage area of the local wireless links by combining the signals from local area base stations and routing the combined signal back to the base stations. The base stations provide two-way open wireless communication channels among mobile devices situated within wireless signal coverage area of each of the base stations.

19 Claims, 4 Drawing Sheets

PROVIDING DISTRIBUTED WIDE AREA COVERAGE INFRASTRUCTURE USING BLUETOOTH SIGNAL COMBINER

CROSS-REFERENCE TO RELATED APPLICATIONS

This application claims priority from U.S. Provisional Application Ser. No. 60/681,088, filed on Mar. 13, 2005.

BACKGROUND

Wireless local area network systems such as 802.11 and Home RF are well known. Latest addition to the wireless field includes the Bluetooth® technology which provides simple full duplex point-to-point wireless communication system. These systems are configured to provide wireless access to user devices using access points, such as base stations, within a small coverage area (typically about 30 to 100 feet). Extended coverage over a larger area requires longer-range radio terminals and base stations configured into a wide area network such as a cellular network. However, radio terminals and base stations required for wide area networks can be expensive and may require government licenses.

DETAILED DESCRIPTION

This disclosure describes systems and methods for combining wireless local area link signals, such as Bluetooth® signals, to provide distributed wide area coverage infrastructure.

Figure 1:
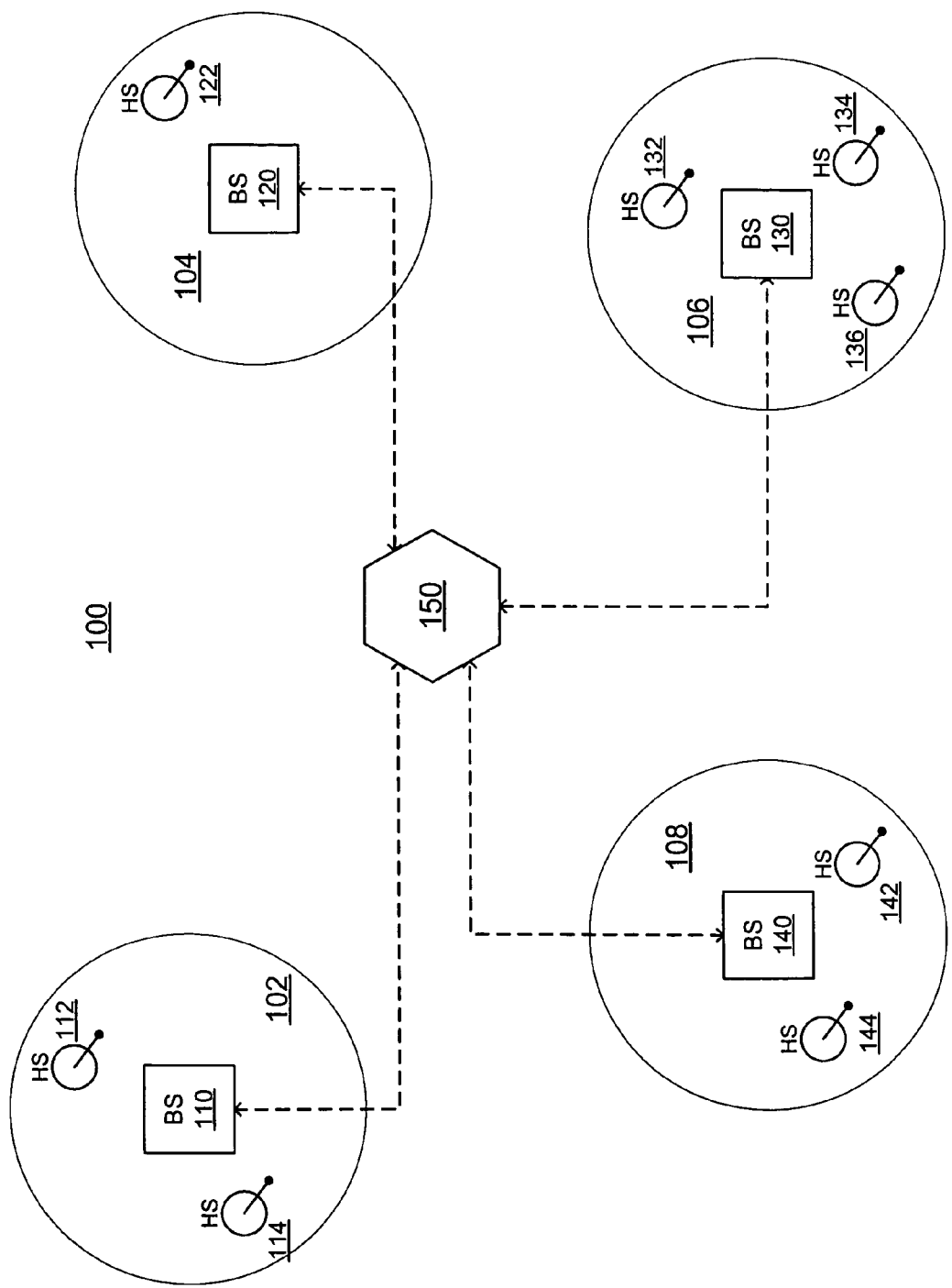
FIG. 1 shows one implementation of a distributed wide area coverage system, which includes a wireless local area link signal combiner.

FIG. 1 shows one implementation of a distributed wide area coverage system 100, which includes Bluetooth signal combiner 150. The signal combiner 150 combines signals from selected local area base stations to provide distributed wide area coverage.

Each local coverage area is bounded by a wireless signal coverage area of a base station providing two-way full-duplex communication between/among the base station and mobile devices located within the local coverage area. In one implementation, the two-way communication between/among the base station and the mobile devices (e.g., mobile headsets) is configured with Bluetooth® transceivers. This configuration provides relatively low-cost implementation of a communication network providing wireless local coverage.

For example, local coverage area 102 is bounded by a wireless signal coverage area of a base station (BS) 110, which provides two-way communication among BS 110 and mobile headsets (HS) 112, 114. In one implementation, a signal combiner in the base station provides an open communication channel among mobile devices within the coverage area.

The distributed wide area coverage system 100 also includes local coverage areas 104, 106, 108. Local coverage area 104 is bounded by a wireless signal coverage area of a base station (BS) 120, which provides two-way communication between BS 120 and mobile headset (HS) 122. Local coverage area 106 is bounded by a wireless signal coverage area of a base station (BS) 130, which provides two-way communication among BS 130 and mobile headsets (HS) 132, 134, 136. Local coverage area 108 is bounded by a wireless signal coverage area of a base station (BS) 140, which provides two-way communication among BS 140 and mobile headsets (HS) 142, 144.

In the illustrated implementation of FIG. 1, the signal combiner 150 is configured to receive signals from base stations (BS) 110, 120, 130, 140. The combiner 150 then combines the signals to provide open communication channels among mobile devices 112, 114, 122, 132, 134, 136, 142, 144 within a distribute wide area coverage encompassing the total coverage area including areas 102, 104, 106, 108. In one implementation, the connections between the signal combiner 150 and the base stations 110, 120, 130, 140 are configured as hard-wired connections. In another implementation, the signal combiner 150 and the base stations 110, 120, 130, 140 are connected through wired network connections such as telephone (e.g., using PSTN or cellular network) and cable connections.

Figure 2:
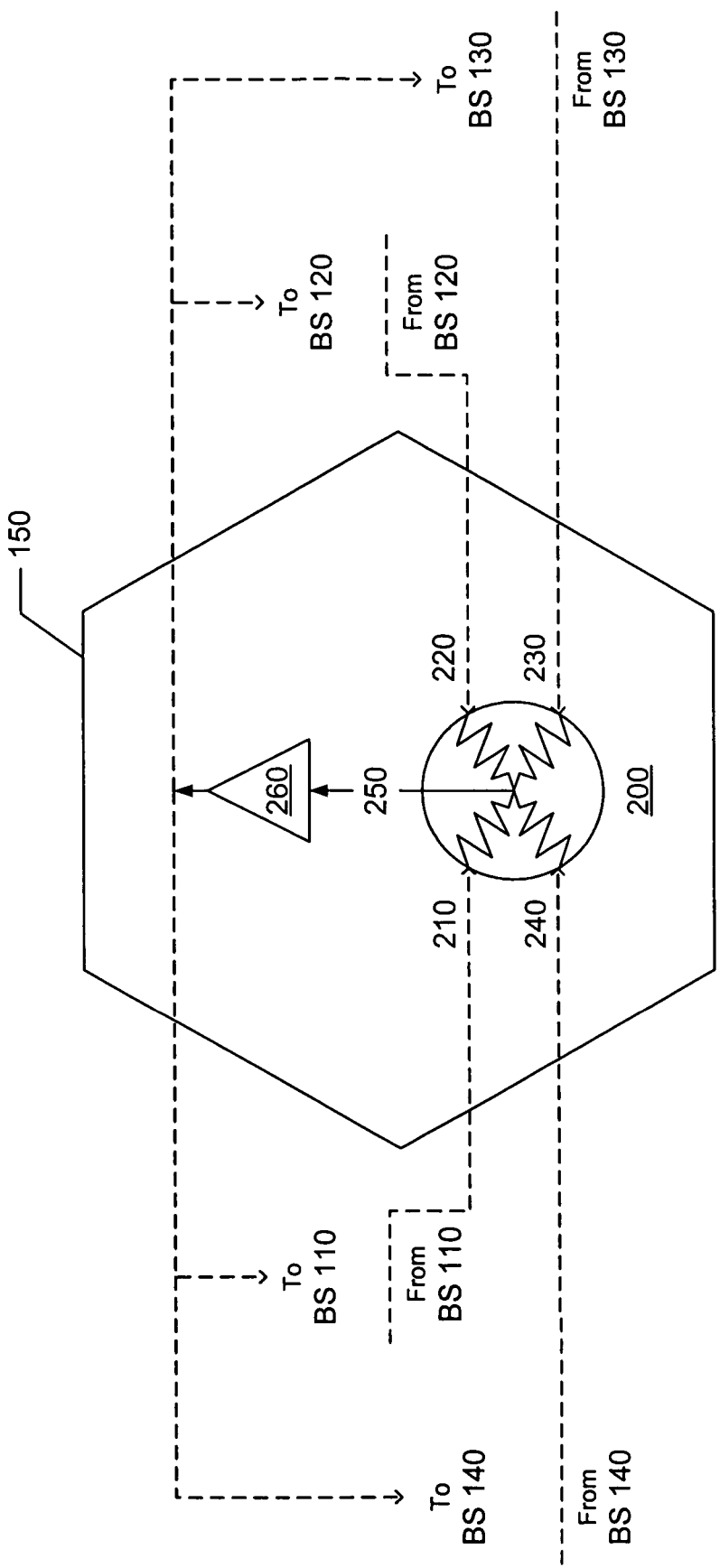
FIG. 2 shows a detailed diagram of one implementation of the signal combiner illustrated in FIG. 1.

FIG. 2 shows a detailed diagram of one implementation of the signal combiner 150 illustrated in FIG. 1. The signal combiner 150 includes a signal mixer 200 and an echo canceller 260. The signal mixer 200 receives and combines signals 210, 220, 230, 240, respectively, from base stations 110, 120, 130, 140. The combined signal 250 is then routed back to the base stations 110, 120, 130, 140 through the echo canceller 260. In some implementations, the echo canceller 260 can be omitted. Thus, by combining the signals from local area base stations 110, 120, 130, 140 and routing the combined signal back to the base stations, the signal combiner 150 effectively expands the coverage area of the local wireless links.

Figure 3:
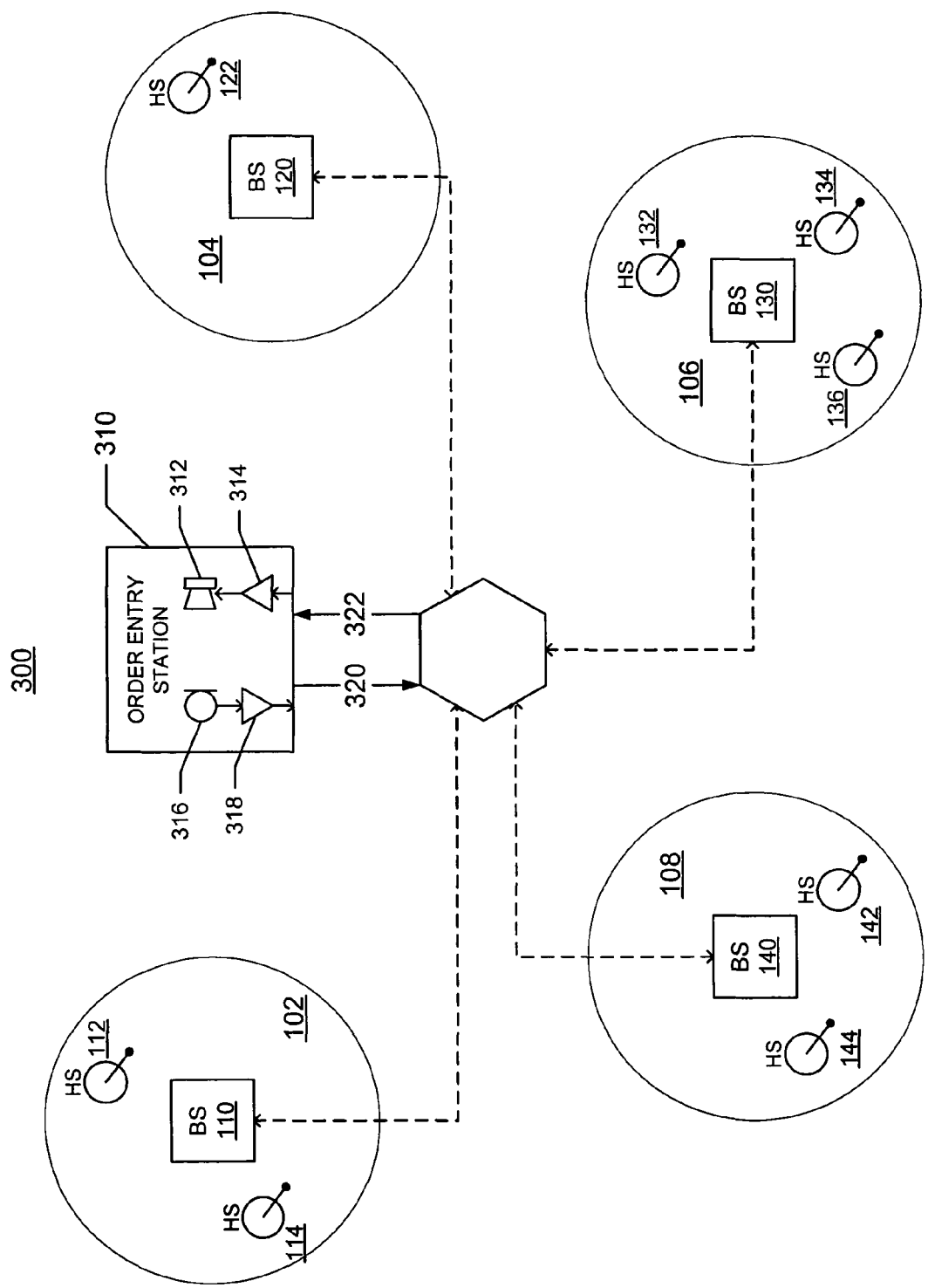
FIG. 3 illustrates one example of a distributed wide area coverage system used in commerce.

FIG. 3 illustrates one example of a distributed wide area coverage system 300 used in commerce. The distributed wide area coverage system 300 is configured substantially similar to the system 100 shown in FIG. 1. However, the system 300 further includes an order entry station 310 such as an entry station in a drive-thru restaurant. Thus, the system 300 provides a customer at the order entry station 310 with an open channel service to multiple customer service agents wearing mobile headsets 112, 114, 122, 132, 134, 136, 142, 144. In some implementations, each customer service agent provides different service to the customer.

When the customer enters an order at the order entry station 310, the order is picked up by a microphone 316. The signal from the microphone is amplified by an amplifier 318 and is transmitted to the signal combiner 150. The amplified signal 320 is mixed with signals from base stations 110, 120, 130, 140 at the mixer 200 (see FIG. 2). The mixed signal 322 is then transmitted back to the order entry station 310. The signal 322 is received at a speaker amplifier 314 and routed to a speaker 312.

Figure 4:
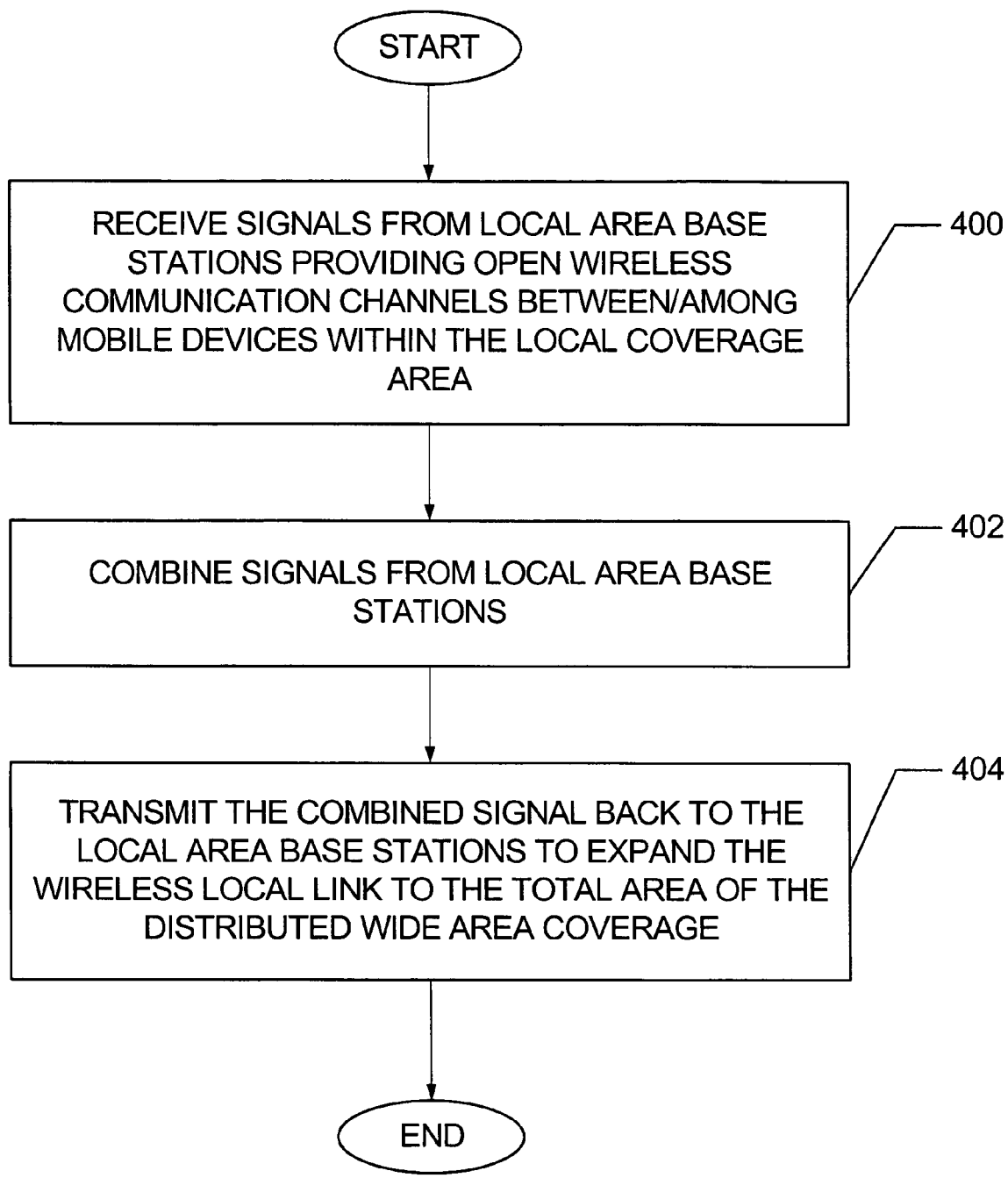
FIG. 4 illustrates one implementation of a distributed wide area coverage method.

FIG. 4 illustrates one implementation of a distributed wide area coverage method, which includes receiving signals from local area base stations, at 400, providing open wireless communication between/among mobile devices within the local coverage area. The signals from the local area base stations are combined, at 402. The combined signal is then transmitted back to the local area base stations, at 404, to expand the wireless local link to the total area of the distributed wide area coverage.

Various implementations of the invention are realized in electronic hardware, computer software, or combinations of these technologies. Most implementations include one or more computer programs executed by a programmable computer. For example, in one implementation, the system for combining wireless local area link signals to provide distributed wide area coverage includes one or more computers executing software implementing the combining of the wireless local area link signals discussed above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Although various illustrative implementations of the present invention have been described, one of ordinary skill in the art will see that additional implementations are also possible and within the scope of the present invention. For example, while the illustrated figures show only one signal combiner, the system can be configured with a plurality of combiners operating to combine the wireless local area link signals. Further, although the illustrated figures show only four local coverage areas, any number of local coverage areas can be combined by the signal combiner.

Accordingly, the present invention is not limited to only those implementations described above.

What is claimed is:

1. A distributed wide area coverage system, comprising:
   a plurality of Bluetooth-capable local area base stations,
   each base station being capable of providing two-way open wireless Bluetooth-capable communication channels only among mobile devices situated within wireless signal coverage area of that base station, wherein the two-way open wireless communication is configured with Bluetooth transceivers; and
   a Bluetooth-capable signal combiner configured to receive Bluetooth-capable signals from said plurality of local area base stations,
   said signal combiner capable of combining the Bluetooth-capable signals from said plurality of local area base stations to generate a single combined Bluetooth-capable signal that forms an open communication channel among the mobile devices situated within each of the plurality of local area base stations, and transmitting the single combined Bluetooth-capable signal back to said plurality of local area base stations.

2. The distributed wide area coverage system of claim 1, further comprising:
   a second signal combiner,
   wherein the second signal combiner is located within one of the plurality of local area base stations and is capable of combining the signals from each of a plurality of mobile devices situated within wireless signal coverage area to generate a combined signal, and transmitting the combined signal back to each of the plurality of mobile devices.

3. The distributed wide area coverage system of claim 1, wherein at least one of the mobile devices is a wireless headset.

4. The distributed wide area coverage system of claim 1, wherein a connection between the signal combiner and the local area base stations are configured as hard-wired connections.

5. The distributed wide area coverage system of claim 1, wherein a connection between the signal combiner and the local area base stations are configured as wireless connections.

6. The distributed wide area coverage system of claim 1, further comprising:
   an echo canceller for cancelling echo before a combined signal is routed back to the local area base stations.

7. The distributed wide area coverage system of claim 1, further comprising:
   an order entry station providing a customer with an open channel service to at least one of the local area base stations.

8. The distributed wide area coverage system of claim 1, wherein at least one of the mobile devices receives an open wireless communication.

9. The distributed wide area coverage system of claim 8, wherein at least another one of the mobile devices receives and sends an open wireless communication.

10. A method for expanding a coverage area of a plurality of local wireless links, comprising the steps of:
    providing two-way open wireless Bluetooth-capable communication channels only among mobile devices situated within a same local wireless signal coverage area, wherein the two-way open wireless communication is configured with Bluetooth transceivers;
    receiving Bluetooth-capable signals from each of a plurality of local wireless signal coverage areas,
    combining the Bluetooth-capable signals from said plurality of local wireless signal coverage areas to generate a Bluetooth-capable single combined signal that forms an open communication channel among the mobile devices situated within each of the plurality of local area base stations; and
    transmitting the Bluetooth-capable single combined signal back to said plurality of local wireless signal coverage areas.

11. The method for expanding a coverage area of a plurality of local wireless links of claim 10, further comprising:
    a second signal combining step for combining received signal from among each of the mobile devices situated within the local wireless signal coverage areas.

12. The method for expanding a coverage area of a plurality of local wireless links of claim 10,
    wherein at least one of the mobile devices is a wireless headset.

13. The method for expanding a coverage area of a plurality of local wireless links of claim 10,
    wherein a connection used in the receiving step is configured as a hard-wired connection.

14. The method for expanding a coverage area of a plurality of local wireless links of claim 10,
    wherein a connection used in the receiving step is configured as a wireless connection.

15. The method for expanding a coverage area of a plurality of local wireless links of claim 10, further comprising:
    an echo cancelling step for cancelling echo before a combined signal is transmitted back to the local area base stations.

16. The method for expanding a coverage area of a plurality of local wireless links of claim 10, further comprising:

an order entry step providing a customer with an open channel service to at least one of the local wireless signal coverage areas.

17. The method for expanding a coverage area of a plurality of local wireless links of claim 7, wherein receiving the Bluetooth-capable signals is performed by at least one of the mobile devices.

18. A computer-implemented program embodied on a non-transitory computer readable medium for expanding a coverage area of a plurality of local wireless links, the computer comprising a processor and an accessible repository and providing instructions, the instructions comprising the steps of:

proviidng two-way open wireless Bluetooth-capable communication channels only among mobile devices situated within a same local wireless signal coverage area, wherein the two-way open wireless communication is configured with Bluetooth transceivers;

receiving Bluetooth-capable signals from each of a plurality of local wireless signal coverage areas, combining the Bluetooth-capable signals from said plurality of local wireless signal coverage areas to generate a single combined Bluetooth-capable signal that forms an open communication channel among the mobile devices situated within each of the plurality of local area base stations; and transmitting the Bluetooth-capable single combined signal back to said plurality of local wireless signal coverage areas.

19. A distributed wide area coverage system, comprising:

a plurality of Bluetooth-capable local distributed wide area coverage systems; and a Bluetooth-capable signal combiner capable of combining Bluetooth-capable signals from said plurality of Bluetooth-capable local distributed wide area coverage systems to generate a Bluetooth-capable combined signal, and transmitting the combined Bluetooth-capable signal back to said plurality of local distributed wide area coverage systems, wherein each of the plurality of Bluetooth-capable local distributed wide area coverage systems comprise:

a plurality of Bluetooth-capable local area base stations, each base station being capable of providing two-way open wireless Bluetooth-capable communication channels only among mobile devices situated within wireless signal coverage area of that base station, wherein the two-way open wireless communication is configured with Bluetooth transceivers; and a Bluetooth-capable signal combiner configured to receive signals from said plurality of Bluetooth-capable local area base station, said Bluetooth-capable signal combiner capable of combining the signals from said plurality of Bluetooth-capable local area base stations to generate a single combined Bluetooth-capable signal that forms an open communication channel among the mobile devices situated within each of the plurality of local area base stations, and transmitting the single combined Bluetooth-capable signal back to said plurality of local area base stations.

* * * * *